Jan. 7, 1964   D. N. HADLEY   3,116,725
SMOG CONTROL DEVICE AND METHOD FOR INTERNAL COMBUSTION ENGINES
Filed April 20, 1961   3 Sheets-Sheet 1
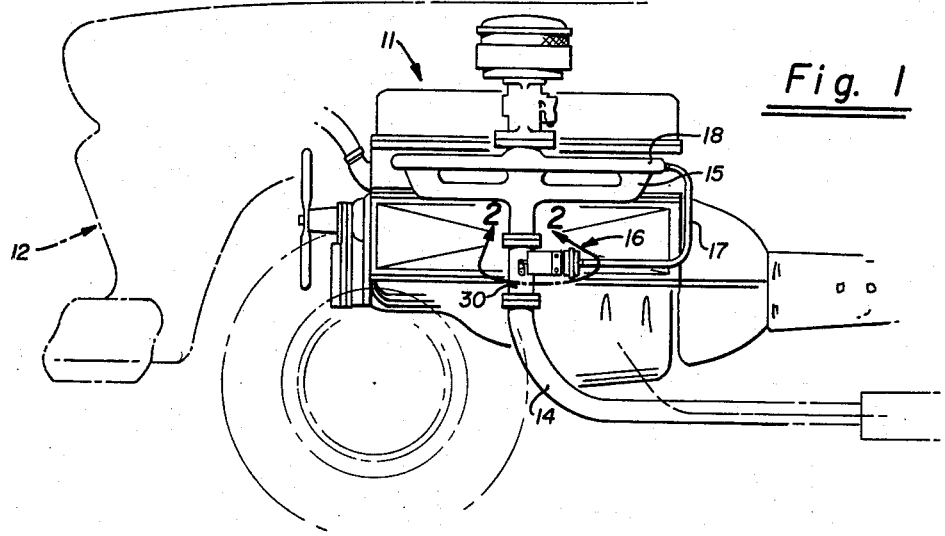
*Fig. 1*
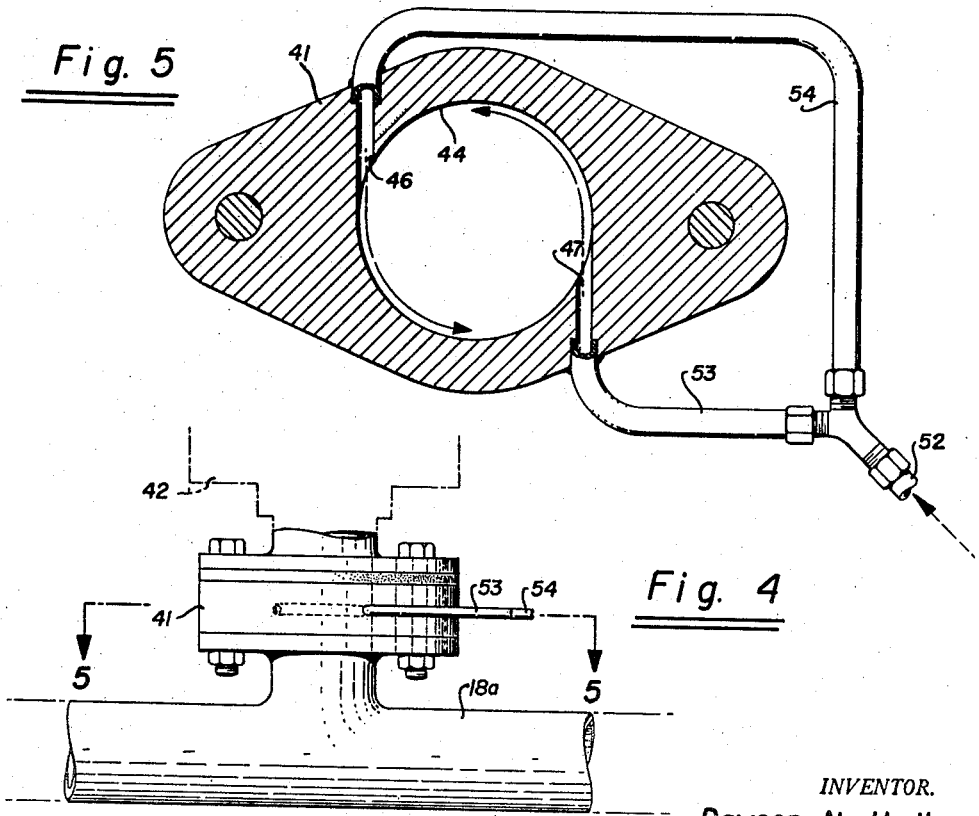
*Fig. 5*
*Fig. 4*
INVENTOR.
Dawson N. Hadley
BY
His Attorney Jan. 7, 1964 D. N. HADLEY 3,116,725
SMOG CONTROL DEVICE AND METHOD FOR INTERNAL COMBUSTION ENGINES
Filed April 20, 1961 3 Sheets-Sheet 2

INVENTOR.
Dawson N. Hadley
His Attorney

Jan. 7, 1964     D. N. HADLEY     3,116,725
SMOG CONTROL DEVICE AND METHOD FOR INTERNAL COMBUSTION ENGINES
Filed April 20, 1961     3 Sheets-Sheet 3

INVENTOR.
Dawson N. Hadley
BY
His Attorney

United States Patent Office 3,116,725
Patented Jan. 7, 1964

3,116,725
SMOG CONTROL DEVICE AND METHOD FOR INTERNAL COMBUSTION ENGINES
Dawson N. Hadley, Claremont, Calif., assignor to Benjamin H. Hadley
Filed Apr. 20, 1961, Ser. No. 104,445
1 Claim. (Cl. 123—119)

The invention relates to the various proposals which have been made for reducing the smog producing products discharged from an internal combustion engine as used in automobiles, trucks and other vehicles and installations.

It has been found that the smog producing products emitted by an internal combustion engine are chargeable to unburned or incompletely burned hydrocarbons in the engine exhaust. It has been further found that the emission of these smog producing products is most acute when the engine is operating under deceleration conditions, and secondarily, although to a somewhat less degree when the engine is operating under partial load conditions.

The principal evil occurring under these conditions is that the engine does not fire on every stroke. It has been estimated that under deceleration conditions an engine may fire no more than once out of every ten to twenty cycles and this firing is at random and is not likely to produce complete combustion because of the excessively rich mixture which is usually stratified around the spark plugs of the engine. A companion evil is the leading of the spark plugs which is common in modern automobiles using ethyl fuels and which tends to short out the plugs, making a very weak spark at the points, in some instances too weak to promote flame propagation in the combustion chamber. As will be understood this condition aggravates and accentuates the emission of smog producing products from the engine. The deposit of lead on the spark plugs is a phenomenon considered somewhat akin to the stratification or condensation of the fuel in the combustion chamber above-noted.

The trend in modern automobile design for several years has been to cold carburetion. This has been brought about due to the development of fuels having a high stable volatility and thus providing for the maximum charge of cool combustion gases into the engine cylinder for maximum horsepower output per unit displacement. High octane fuels and high volatility have enabled the further increase in compression ratio and combustion efficiency. However, under deceleration and partial load conditions, the small charge of cold gas reaching the cylinder may actually be too cold to properly ignite.

This effect is accumulative since if a charge fails to burn in the cylinder, the cylinder walls remain cold and do not help to heat up the next charge thereby promoting condensation of the fuel and cooling of the incoming charge, both of which in turn cumulatively deters combustion.

The solution provided by the present invention is to retain in the engine cylinders during deceleration and partial load conditions a quantity of exhaust gases which are admixed with the incoming fuel and air mixture to promote complete burning of the fuel. This is accomplished in accordance with the present invention by the establishing during the adverse operating conditions noted of a back pressure in the exhaust system of the engine and in regulating the magnitude of this back pressure as a function of the vacuum or reduced pressure in the intake manifold system of the engine, thus establishing a back pressure in the exhaust passage as an inverse function of the fuel intake of the engine. In accordance with the present invention the back pressure established in the exhaust system is accordingly maximum under decelerating conditions, nominal under partial load conditions, and minimized or eliminated under full load conditions, so as to not impair or interfere with the development of the full horsepower potential of the engine.

The presence of back pressure in the exhaust system causes the retention of exhaust gas in the cylinders which promote more even temperature distribution throughout the combustion zone, the cylinder walls and combustion chamber, thereby promoting the best environment for complete combustion of the incoming fresh fuel charge. Secondly, by retaining residual exhaust products in the cylinder there occurs an automatic decrease of unwanted fuel during deceleration. Thus, in accordance with the present invention and as a principal object thereof, the engine exhaust products are emitted substantially free of unburned or incompletely burned hydrocarbon smog producing products. By creating excessive backpressure during all conditions of engine load, except full load-maximum speed, the back-pressured engine is in its functional operation akin to a normal engine with after burning, the back pressure phasing-in as an after burning function.

Another object of the present invention is to provide a device of the character described which will promote improved engine efficiency, operating economy, and smoothness of combustion of the automobile engines.

A further object of the present invention is to provide a device of the character described which will afford a desired braking of the vehicle speed during decelerating conditions of operation.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claim.

Referring to said drawings (three sheets):

FIGURE 1 is a side elevation of an internal combustion engine equipped with a smog control device constructed in accordance with the present invention.

FIGURE 4 is a side elevation of a modified form of the device.

FIGURE 5 is a cross-sectional view taken substantially on the plane of line 5—5 of FIGURE 4.

Figure 3:
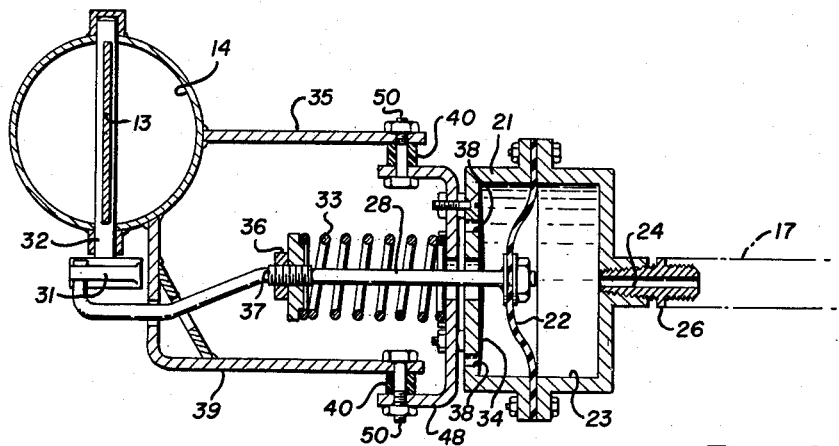
FIGURE 3 is a cross-sectional view of the device taken substantially on the plane of line 3—3 of FIGURE 2.
Figure 2:
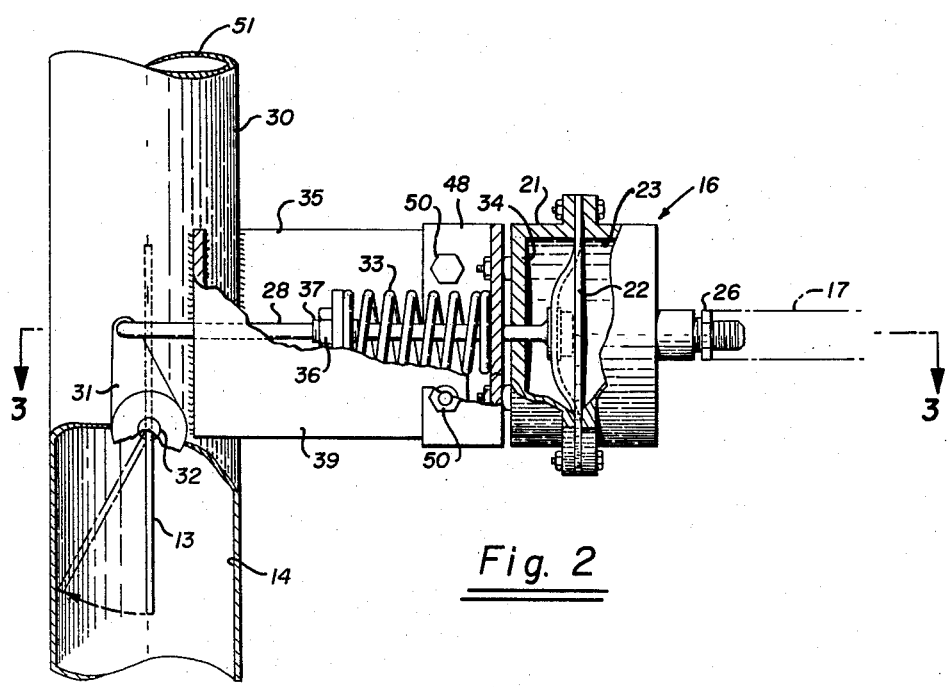
FIGURE 2 is an enlarged side elevation of the device partly in section as suggested by line 2—2 of FIGURE 1.
Figure 6:
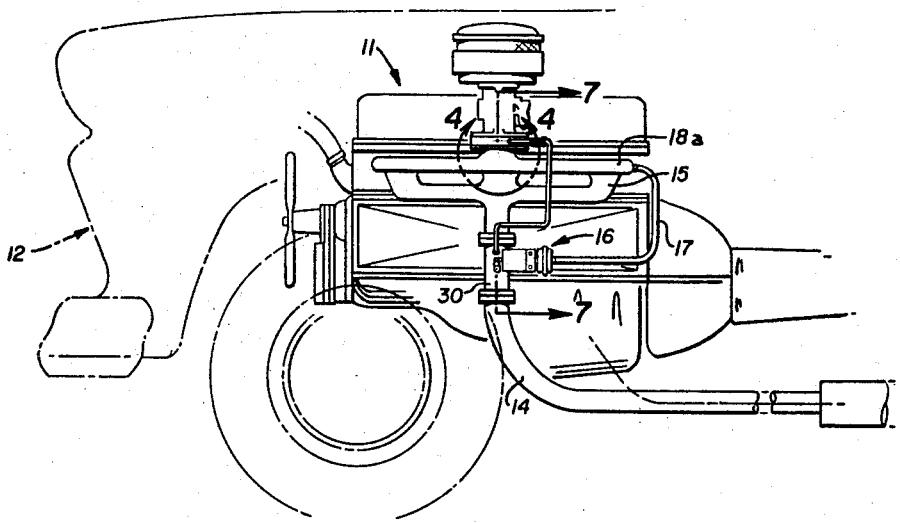
FIGURE 6 is a side elevation of an internal combustion engine equipped with a modified form of the device.

With reference to the accompanying drawings, the smog control device of the present invention is adapted for use in conjunction with the internal combustion engine 11 of an automotive vehicle 12, and consists briefly of a valve 13 which is mounted in the exhaust passage 14 of the engine leading from the exhaust manifold 15 for establishing and regulating back pressure therein, the valve being moveable in the passage between an open position and a flow restricting position as illustrated in FIGURE 2; and a pressure responsive actuator 16 having a fluid connection 17 to the intake passage or manifold 18 of the engine and which is responsive to the pressure in the intake manifold and is connected to the valve for movement thereof toward restricted flow position as a function of the magnitude of the vacuum or reduced pressure in the intake manifold. Accordingly, the device of the present invention may be broadly considered as a means for establishing and regulating a back pressure in the exhaust passage of the engine as a function of the reduced pressure in the intake passage of the engine or stated otherwise as an inverse function of the fuel intake of the engine.

Preferably, the pressure responsive actuator 16 is of the pneumatic type and here comprises a housing 21 having a flexible diaphragm 22 mounted therein to provide a closed pressure responsive chamber 23 which is formed with an inlet passage 24 defined by a fitting 25 here connected by a flexible conduit providing the fluid connection 17 and which is in turn connected to a fitting provided on the intake manifold 18 of the engine. An actuating rod 28 is here fastened to diaphragm 22 and projects therefrom through the housing for connection to a crank arm 31 secured to the mounting shaft 32 of butterfly valve 13.

Valve 13 is designed to fully close at a relatively small acute angle, here shown at approximately 25°, to permit the valve to move from closed to fully opened position with a minimum stroke and also to prevent possible sticking of the valve in closed position. Also preferably the valve is arranged close to the exhaust manifold of the engine in order to keep the valve at a maximum temperature to prevent sticking.

A spring 33 is here used for urging valve 13 to open position so that as the engine throttle is opened up to call for higher engine performance, diaphragm 22 will be released by the increasing pressure in the intake manifold to permit spring 33 to swing valve 13 towards its open position. Contrariwise when the operator of the vehicle closes the engine throttle thus establishing a decelerating condition, the reduced intake manifold pressure will displace diaphragm 22 against the action of spring 33 to swing valve 13 towards closed position. This arrangement has the added safety feature causing the valve to always fail open in the event of diaphragm failure, thereby not impairing the normal operation of the vehicle.

Preferably the pressure responsive mechanism and valve unit is mounted in fairly closely coupled relation to the exhaust manifold 15 so as to provide a most rapid and sensitive response to engine operating conditions. However, it is desirable to insulate the pressure responsive unit 13 and diaphragm 22 therein from relatively high exhaust gas temperature. Accordingly housing 21 is here supported on an exhaust pipe section 30 (inserted by appropriate end flanges in the exhaust line 14) by means of brackets 35 and 39 which have heat insulation connections 40 to a U-shaped bracket 48 secured to an end wall 34 of housing 21. Connections 40 here include a plurality of heat insulation tubes clamped between brackets 35, 39 and 48 by means of a plurality of nut and bolt assemblies 50. Tubes 40 may be formed of fibre glass or other mechanically sturdy heat insulation material.

Some adjustment is desirably provided for spring tension and to compensate for small differences in production of springs and diaphragm. As here shown, spring 33 is of helical form and is mounted in surrounding relation to rod 28 and in compression with one end bearing on mounting bracket 48 and its other end bearing on an adjustment nut 36 carried on a threaded portion 37 of the shaft 28. Normally valve 13 will be open when the engine is stopped and when the engine is operated under open throttle. However, in some instances it may be desirable to adjust the open position of the valve so as to create some back pressure even at wide open throttle operation for some types of engines to thereby inject exhaust gas at full power. Wall 34 is here formed with one or more vents 36 to the atmosphere so as to maintain the adjacent chamber of the housing at atmospheric pressure.

Preferably the parts are adjusted to provide a back pressure in the exhaust system of between 3 and 25 pounds per square inch guage under normal decelerating conditions. It is to be noted, however, that the imposing of this back pressure effectively reduces the amount of intake of fuel and air mixture, accomplished by valve overlap reducing admission of intake charge, and with a reduction in the intake charge there is a corresponding reduction in the volume of exhaust gas to be discharged. Accordingly, the discharge volume will decrease as an accumulative effect as the volume of fuel and air mixture is decreased. Under the present system the exhaust pressure is a function of the intake volume of fuel and air mixture and the valve position as determined by the intake manifold pressure.

As hereinabove noted, the system is also preferably adjusted to provide back pressure in the exhaust system under partial load or steady state cruising conditions. For example at a cruising speed of say 30 to 40 miles per hour a back pressure of about 8 to 11 pounds per square inch is suggested. This back pressure should be reduced at higher cruising speeds corresponding to higher power demand made on the engine. For example, at a cruising speed of say, approximately 65 miles per hour, an exhaust back pressure of 5 to 8 pounds per square inch is suggested. Under accelerating and full load conditions of operation the exhaust back pressure may be reduced to afford maximum power output.

The imposing of back pressure in the exhaust system of the engine provides a number of desirable effects including the increasing of the ratio of burned to unburned gases in the cylinder; more complete combustion of the burnable gases; a maintaining of hotter cylinder walls and combustion chamber to prevent stratification of the fuel and promote complete combustion; and the retention in the cylinders of hot burned and/or unburned gases for admixing with and dilution of the incoming fuel and air mixture. The present system works an economy in two ways. It provides better and more complete combustion under operating conditions when power is required and substantially reduces the fuel intake under decelerating conditions when no power output of the engine is desired. A secondary advantage under decelerating condition is that the engine will provide improved braking action when operated in accordance with the present invention. Finally, it has been found that the retention of exhaust gases in the engine cylinders, by valve overlap and back pressure, is effective to reduce the production of smog producing nitrous oxides.

As will be understood the volume of exhaust gases retained in the cylinder by reason of the imposed back pressure is also and importantly a function of the conventionally present intake valve-exhaust valve overlap.

A modified form of the invention is illustrated in FIGURES 4 and 5 for use where it is desired to augment the residual exhaust gas retained in the combustion chamber by by-passing the exhaust gas from the back pressure area 51 of the exhaust system to the intake manifold. Such an arrangement may be desirable for use with those engines having a cam shaft design with little or no intake valve-exhaust valve overlap. Where the conventional valve overlap is not present, it may be desired to increase the residual exhaust gas so as to promote optimum combustion and the reduction of emission of unburned hydrocarbons, carbon monoxide and nitrous oxide as above explained.

Figure 7:
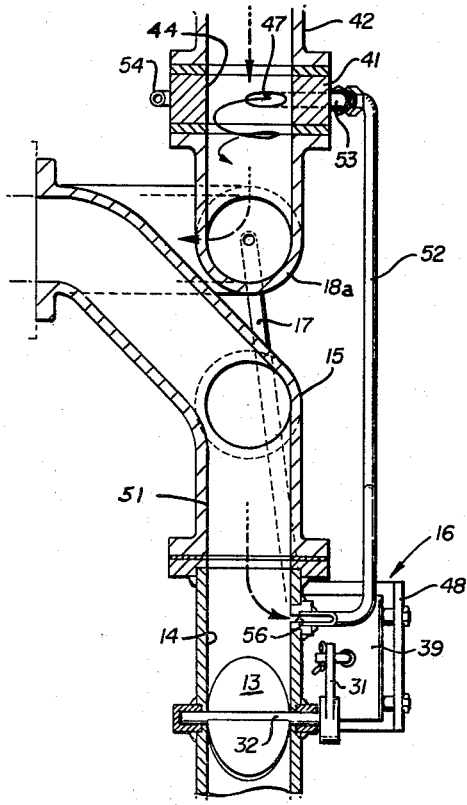
FIGURE 7 is a cross-sectional view of a modified form of the device taken substantially on the plane of line 7—7 of FIGURE 6.

In the modified form of the invention a re-cycle of exhaust gas is accomplished by the pressure modulation in the exhaust line which is back pressured between the valve 13 and the engine. With reference to FIGURE 5 and FIGURE 7, it will be noted that an insert member 41 is mounted between the carburetor 42 and the intake manifold 18a of the engine and is provided with a bore 44 for conducting the air fuel mixture to the intake manifold. Member 41 is additionaly formed with one or more peripheral inlets 46 and 47 which are here arranged tangentially of the bore 44 and are connected to the back pressure zone of the exhaust passage so as to provide a swirling intermix of return exhaust gases with the incoming air and fuel mixture. Exhaust gas is taken from the exhaust pipe at the upstream or pressure side 51 of back pressure valve 13 by means of a conduit 52 connected to opening 56 in exhaust pipe 15. Conduit 52 is here subdivided into a pair of conduits 53 and 54 connected to the peripheral inlets 46 and 47 of the insert member 41. Passages 46 and 47 are dimensioned to properly meter desired quantities of exhaust gases into the intake manifold or orifices may be provided in these passages for that purpose.

In the modified form of the invention under decelerating conditions of the engine, exhaust gases from all of the cylinders is mixed together in the exhaust manifold and in the return exhaust loop 52—54 and in the intake manifold 18a and is reentered through the intake valves into all of the cylinders; and the amount of exhaust gas thus recirculated is a function of the back pressure established in the exhaust system which is in turn a function of reduced pressure in the intake manifold of the engine, thereby providing all of the advantages hereinabove enumerated.

I claim:

An internal combustion engine having an air and fuel mixture intake passage and an exhaust passage, a valve mounted in said exhaust passage and having open and closed positions for regualting the back pressure therein, spring means urging said valve to open position, a pneumatic actuator having a fluid connection to said intake passage and being connected to said valve for moving said valve to closed position agai st the resistance of said spring means under reduced pressure conditions in said intake passage, said spring means moving said valve to open position at relatively elevated pressures in said intake passage to reduce said back pressure, and a conduit connected to said exhaust passage at the back pressure zone thereof and being connected to said intake passage to provide a return of exhaust gases thereto.

References Cited in the file of this patent

UNITED STATES PATENTS

| | | |
|---|---|---|
| 1,793,554 | Moore | Feb. 24, 1931 |
| 2,220,686 | Oberhollenzer | Nov. 5, 1940 |
| 2,700,967 | Maker | Feb. 1, 1955 |

FOREIGN PATENTS

| | | |
|---|---|---|
| 1,019,378 | France | Oct. 29, 1952 |